Figure 1:
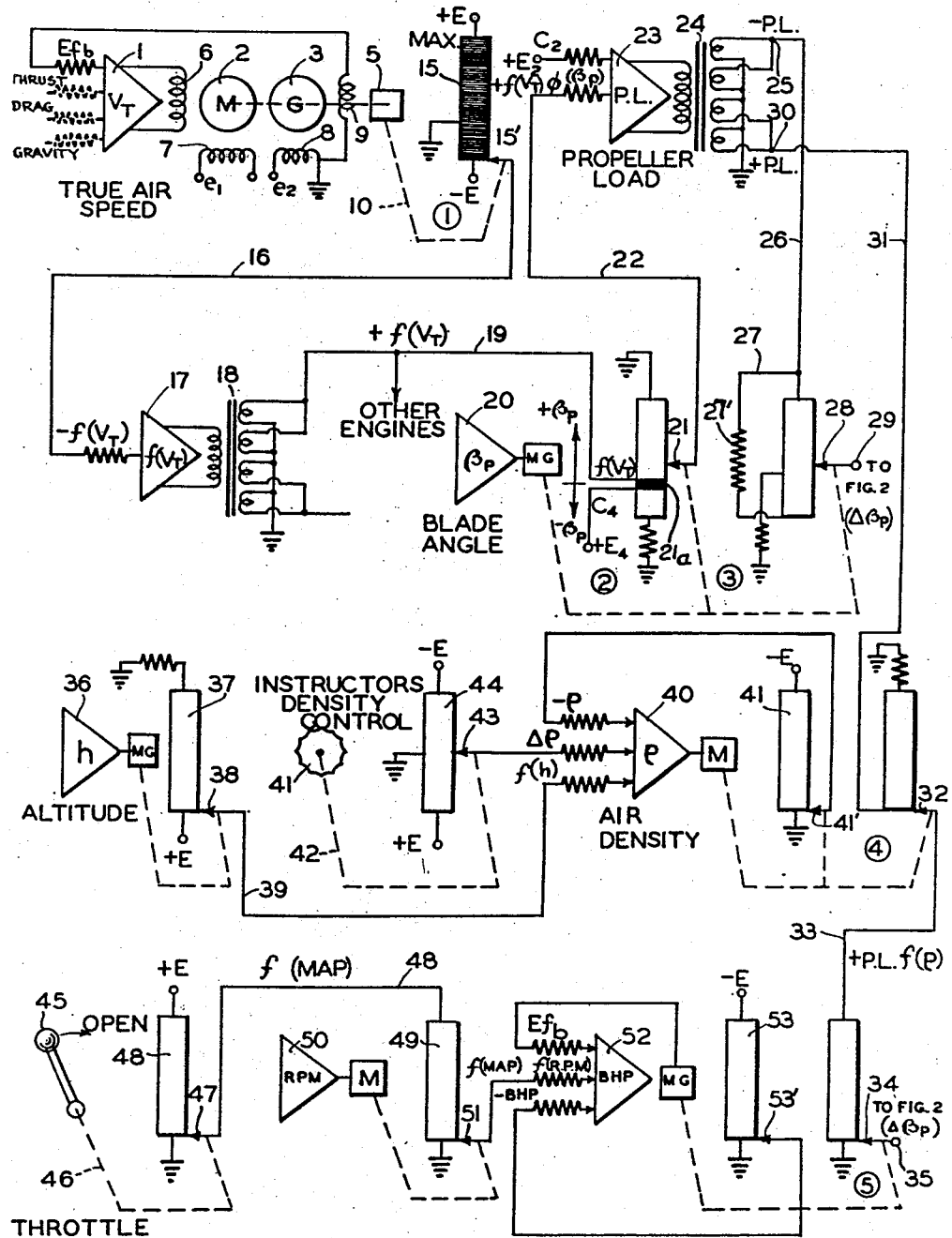

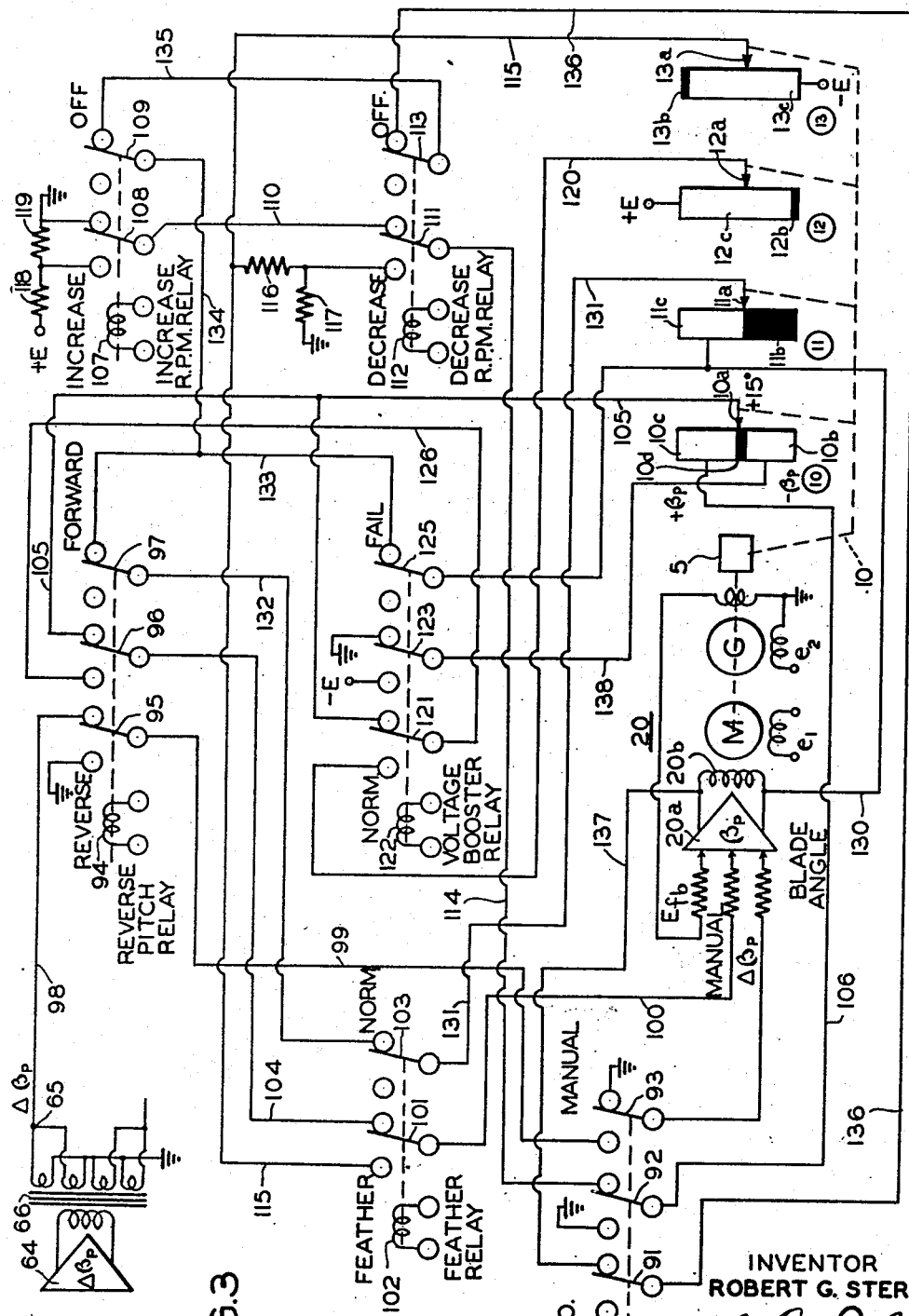

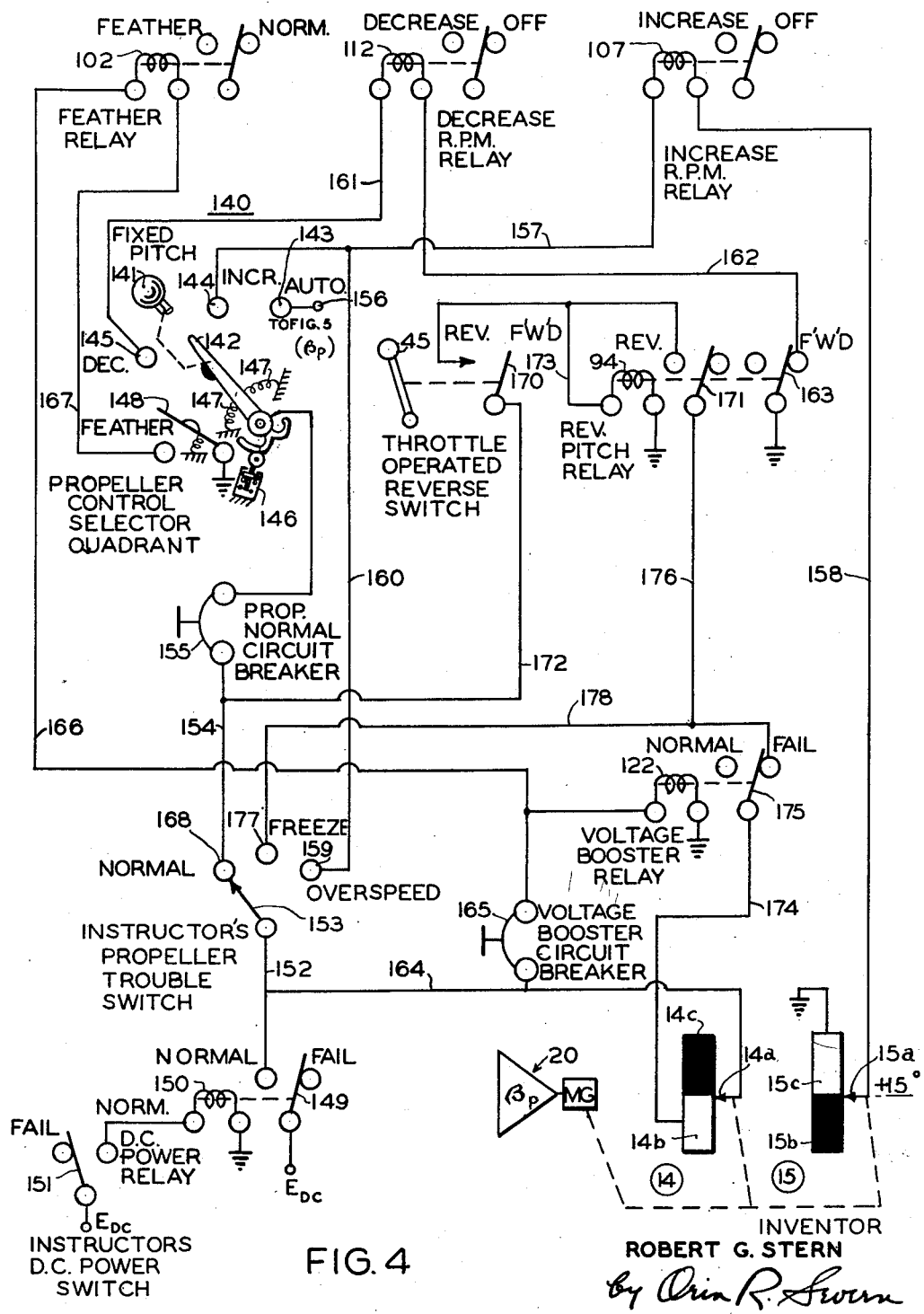

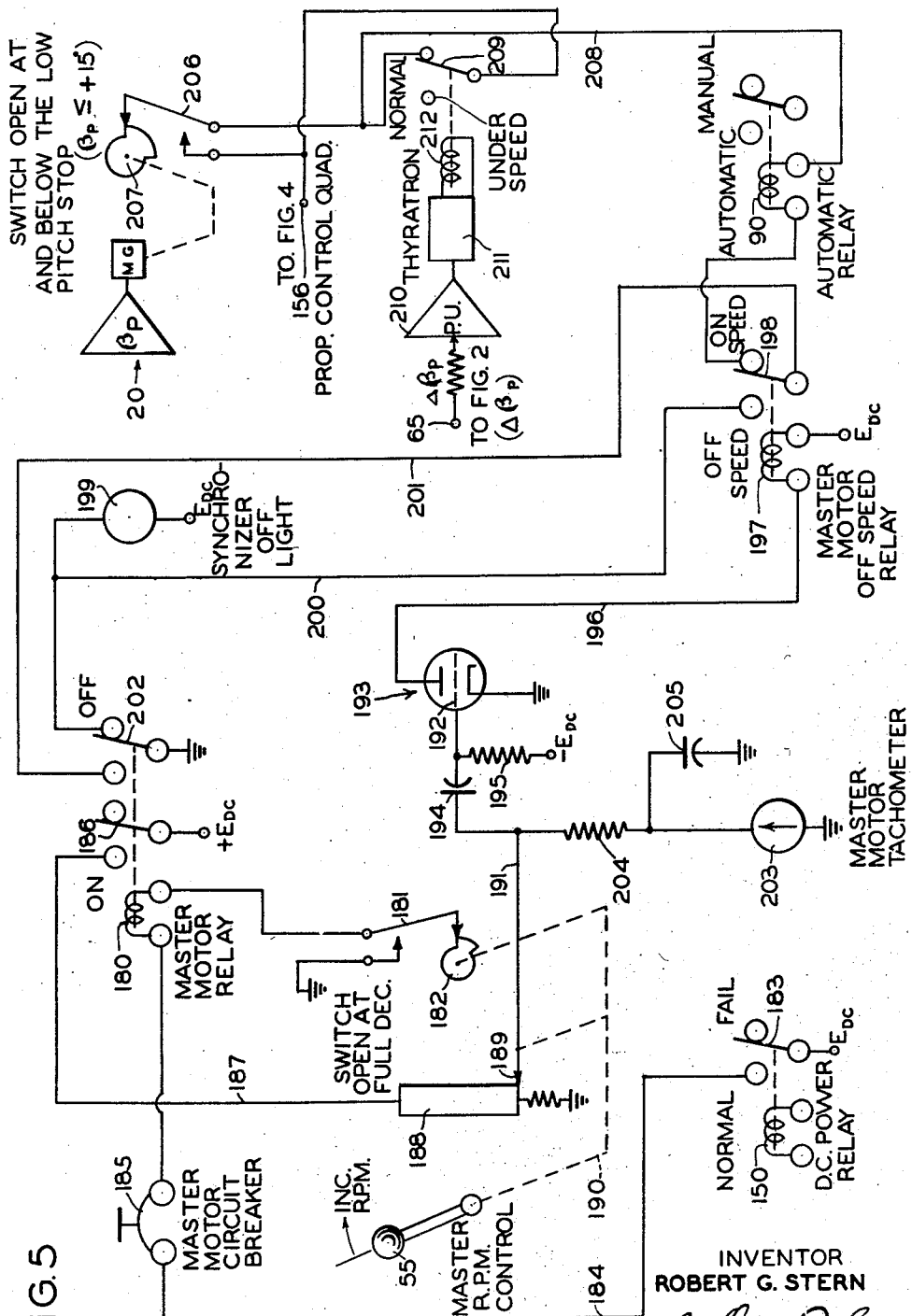

United States Patent Office

2,788,589
Patented Apr. 16, 1957

2,788,589

SIMULATED AIRCRAFT PROPELLER SYNCHRONIZING AND SPEED CONTROLS

Robert G. Stern, Caldwell, N. J., assignor to Curtiss-Wright Corporation, a corporation of Delaware Application August 22, 1952, Serial No. 305,730

32 Claims. (Cl. 35—12)

This invention relates to ground based flight training apparatus for aircraft personnel and in particular to a system and apparatus for simulating the synchronizing, R. P. M. control and related control functions and operation of a well-known type of aircraft propeller for multiple engine aircraft.

Multiple engine aircraft such as used for both military and commercial purposes include a well-known propeller of the variable pitch, constant speed type having an electrically controlled propeller synchronizing and R. P. M. system, an example being the electric propellers used in certain of the type C-124 four-engine aircraft. This propeller is of the full feathering, reversible pitch, constant speed type and has an electric blade angle control system of the synchronizing type. Electric energy is used to operate the electro-mechanical systems which maintain constant engine R. P. M. throughout automatic changes in the angle of the propeller blades. The synchronizer control system includes a so-called "master motor" that is adapted to operate at a predetermined R. P. M. as selected by the pilot, an alternator for each engine for producing a control voltage having a frequency determined by the R. P. M. of the respective engine, and synchronizing and control equipment for comparing and utilizing the signals from the master motor and respective engine alternators. According to this type of control each engine functions as a slave motor in relation to the master motor.

The propeller selector controls for the propeller operation include the propeller control selector quadrants usually installed on the flight engineer's main instrument panel and consist of individual propeller selectors each having five positions, namely, "automatic," "increase R. P. M.," "fixed pitch," "decrease R. P. M." and "feather." When the selector control quadrant is placed in the automatic constant speed position, automatic operation of the propeller is provided at the R. P. M. setting selected by the flight engineer by means of the master R. P. M. control. When the selector control quadrant is placed in the "fixed pitch" position, the propeller will operate as a fixed pitch propeller. From this position, the blade angles of the propeller will be adjusted by momentarily holding the selector lever in either "increase R. P. M." or "decrease R. P. M." position, as required. When the selector control quadrant is placed in the "feather" position, the normal propeller blade-angle-change circuit is broken and the feather circuit is completed. The propeller blades are unfeathered by holding the selector in the "increase R. P. M." position.

The master R. P. M. control lever, which is connected to a similar lever for the flight engineer, is operatively connected to the synchronizer unit, which in turn, operates to vary the R. P. M. of all the engines simultaneously.

The propeller reversing system, which is arranged so as to be operative only when the airplane is on the ground for braking and maneuvering purposes, includes a voltage booster and switches controlled by the throttle lever. When the throttle lever is placed in the reverse-pitch range, the switches are closed to energize the reversing control and the voltage booster, the latter being for the purpose of insuring a fast reversing operation. The booster is also used for insuring a fast feathering operation. When the airplane is air-borne, a suitable mechanical interlock for the throttle lever is controlled through the landing gear to prevent movement of the throttle into "reverse-pitch." When the propeller is in reverse pitch, the control circuits for all normal propeller operations are made inoperative.

In accordance with the present invention, the above described airplane propeller synchronizing and R. P. M. control systems are realistically and accurately simulated by novel coordinated electrical computing means and control apparatus so that aircraft personnel can obtain on the ground by the use of this invention complete and thorough training in the efficient operation of the propeller synchronizing and R. P. M. systems of a large multi-engine airplane.

Further, in accordance with the invention, means are provided whereby an instructor can create simulated operational problems such as "engine seize," "blade angle freeze," propeller overspeed, D. C. bus failure, blowing of circuit breakers, etc. which require instinctive and prompt corrective action by the airplane crew.

The invention will be more fully set forth in the following description referring to the accompanying drawings, and the features of novelty will be pointed out with particularity in the claims annexed to and forming a part of this specification.

Figure 2:
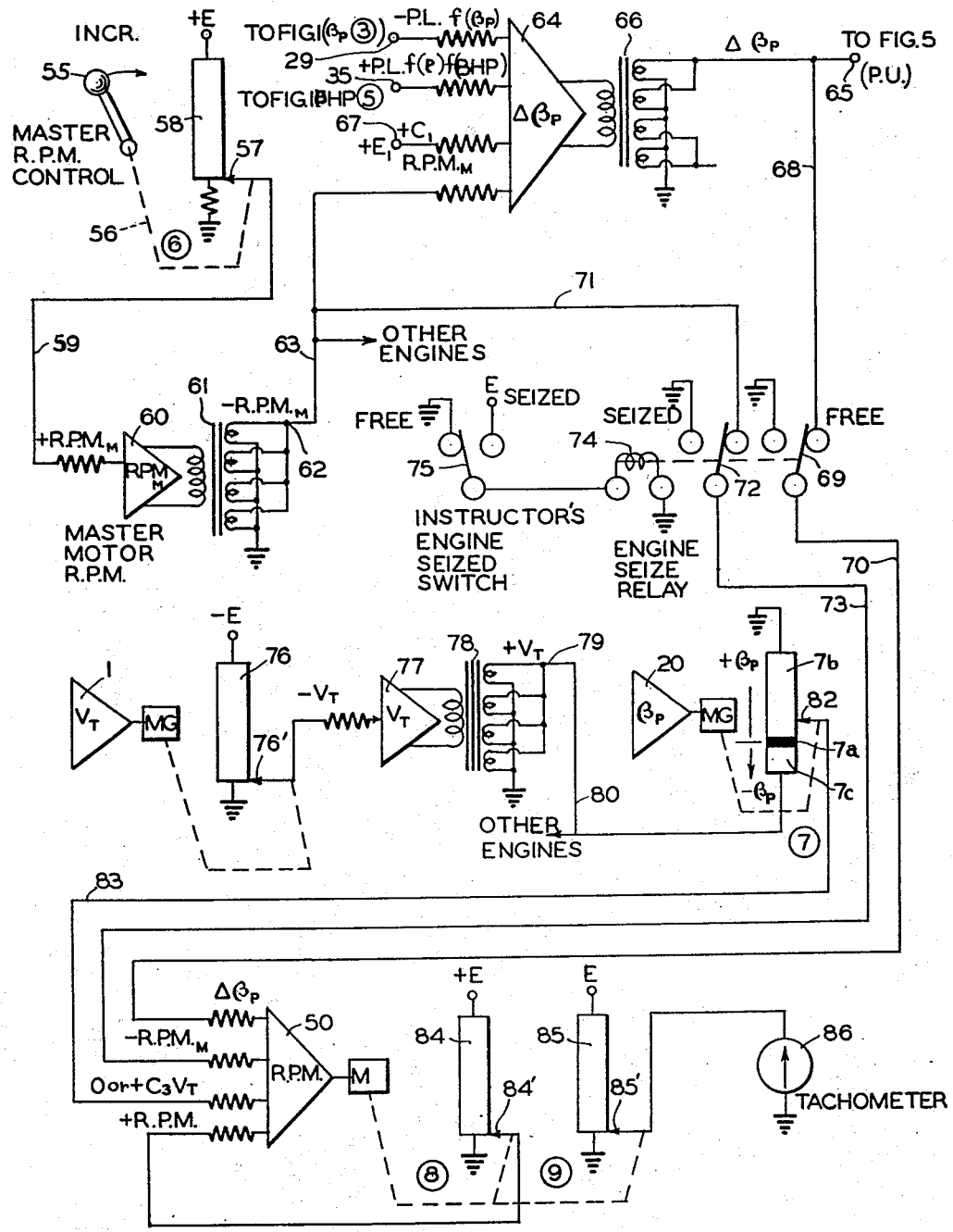

Referring to the drawings,

Fig. 1 is a partly diagrammatic and schematic illustration of a portion of the propeller blade angle ($B_P$) computing system including also the simulated throttle control and means for computing the simulated brake horsepower (B. H. P.) of an individual airplane engine;

Fig. 2 is a similar illustration of another related part of the computing system including the simulated "master R. P. M." control and means for computing the individual engine speed (R. P. M.);

Fig. 3 is a similar illustration of another related part of the computing and control system including essential control relays and means for computing the simulated propeller blade angle ($B_P$);

Fig. 4 is a similar illustration including the simulated propeller control selector quadrant for the aforesaid engine together with control circuits for essential control relays; and Fig. 5 is a similar illustration including the control for the "automatic" and "master motor" relays and the propeller underspeed thyratron, and means for simulating characteristic time lag in changing the speed of the master motor.

Although the specific propeller and R. P. M. control system herein simulated is used in a four-engine airplane, it will be apparent that since each engine is individually controlled from the master motor in essentially the same manner, it is sufficient for the purpose of this application to illustrate the simulated control of a single engine in respect to the master motor.

The apparatus and circuits in general will first be described, after which representative operation problems and the like will be considered.

In Fig. 1 a plurality of servo systems representing respectively true airspeed ($V_T$), propeller blade angle ($B_P$), altitude ($h$) and air density ($\rho$) are used, in combination with the simulated throttle control and brake horse-power (B. H. P.) servo computer, for producing a control quantity or voltage that is a factor for in turn determining the increment or change in blade angle ($\Delta B_p$).

The airspeed servo system will be first described as it is typical of the servo systems incorporated in the computing system of the present invention. In general, the servo system comprises a servo amplifier 1 to which are applied a number of control voltages representing respectively forces affecting airspeed as described in my copending application, S. N. 134,623, filed December 23, 1949. A motor 2 is responsive to the amplifier output for driving a feed-back generator 3 and operating a potentiometer 15 that is operatively connected through a reduction gear box 5 to the motor-generator.

The airspeed servo amplifier 1 is a summing amplifier for determining the resultant of the respective input voltages representing the forces affecting airspeed. Such amplifiers are well known in the art for algebraically summing a plurality of separate A. C. voltages of varying magnitude and polarity, and a detailed circuit illustration is therefore unnecessary.

The output of the amplifier is used to control a servo network including a motor-generator set diagrammatically indicated in other parts of the drawings as M–G. Since the M–G operation is essentially the same for the other servos, a single illustration for the airspeed servo is sufficient. The motor 2 is of the two-phase type, the control phase 6 of which is energized by the amplifier output as illustrated and the other phase 7 by a constant reference A. C. voltage $e_1$ dephased 90° from the control voltage. The operation of this type of motor is well known, the rotation being in one direction when the control and reference voltages of the respective phases have the same instantaneous polarity, and in the opposite direction when the instantaneous polarity of the control voltage is reversed with respect to the reference voltage, the rate of rotation in both cases depending on the magnitude of the control voltage. The motor drives a two-phase feedback generator 3 also having one phase 8 energized by a 90° dephased A. C. reference voltage $e_2$, the other phase 9 generating according to the motor speed a velocity feed-back voltage $E_{fb}$ for purposes of speed control. The feed-back voltage $E_{fb}$ in the airspeed servo system represents $$\frac{dv}{dt}$$

i. e., acceleration, and is an input for the amplifier 1. The motor also serves to gang-operate through a gear reduction train 5 and suitable mechanical connections indicated by dotted lines 10 the contacts of a potentiometer system and may also in certain servo systems operate an appropriate indicating instrument.

The individual potentiometer resistance elements, such as the unit 15 of the airspeed servo system may be of the well-known wound card type and are of circular or band form in practice but are diagrammatically illustrated in a plane development for clearness. A structural arrangement that may be conveniently used for a servomotor and potentiometer combination of the character above referred to is shown by Patent No. 2,431,749, issued December 2, 1947, to R. B. Grant for "Potentiometer Housing and Positioning Structure."

It will therefore be apparent that operation of the servomotor in either direction causes the gang-operated potentiometer slider contacts, such as the slider contact 15', to move to corresponding angular positions on the respective potentiometer elements for deriving, i. e. selecting or picking off, potentiometer voltages dependent on the respective contact position. Each potentiometer of each servo system is shaped or contoured so that the value of the derived voltage at the potentiometer contact bears a certain relationship to the linear movement of the slider contact depending on the particular function of the potentiometer and has a voltage impressed across its terminals depending as to instantaneous polarity and magnitude also on the function of the potentiometer.

In the present case the contour of all functional potentiometers represents the derivative of the function represented. For example, the potentiometers of the airspeed system are for practical purposes of the linear type to represent a relationship $x=y$, where $x$ represents the linear movement of the contact and $y$ represents the derived potentiometer voltage. Stated more specifically, the contour or width variation and therefore the resistance distribution of the various potentiometers used to derive voltages simulating aircraft characteristics is proportional to the derivative of the function of the respective characteristic with respect to the variable represented by the setting of the potentiometer.

For example, let it be assumed that the function is a linear one as where a derived voltage is to be directly proportional to the distance that the servo operated potentiometer contact is from a zero position. The slope of the function curve then is the constant ratio of derived voltage to increase in the independent variable represented by the contact travel from the zero position. The derivative of this relationship is the same for all contact settings so that the width of the card in this case is uniform, making it rectangular in shape. Thus the width of the card at any given contact position is determined by the linear or non-linear character of the function.

In respect to the airspeed servo, it will be apparent that the summation of the various positive and negative forces such as thrust and drag can represent airspeed. Accordingly, an indicator may be if desired connected to the motor output through the gear box 5 and connection 10 and calibrated in terms of airspeed to represent an airspeed meter.

The servo systems subsequently referred to are essentially the same as the airspeed servo system above described and therefore it will be sufficient to illustrate such servos in block schematic form with the motor-generator set generally designated as MG or, if only the servomotor is used, by M.

*Engine R. P. M. calculation*

In practicing the present invention the simulated engine speed is calculated by the following relationships:

For normal operation (positive blade angle):

R. P. M.$=C_1-PL\cdot f(B_p)+$
$$PL\cdot f(\text{B. H. P.})\cdot f(\rho) \quad \text{Equation 1}$$
in which
$$PL=C_2+f(V_T)\cdot \phi B_p$$

For reverse thrust (negative blade angle):

R. P. M.$=C_1-PL\cdot f(B_p)+$
$$PL\cdot f(\text{B. H. P.})\cdot f(\rho)-C_3 V_T \quad \text{Equation 2}$$
in which
$$PL=C_2+C_4\cdot\phi(B_p)$$

$PL$=propeller load
$f(B_p)$=a function of propeller blade angle
$\phi B_p$=another function of propeller blade angle
$f(\text{B. H. P.})$=a function of brake horsepower
$f(\rho)$=a function of air density
$f(V_T)$=a function of true airspeed, and
$C_1 C_2 C_3 C_4$ are constants depending on the propeller design, etc.

Referring again to Fig. 1, the factor $f(V_T)$ is represented by an A. C. voltage and is obtained from the airspeed servo card 15 that is indicated as the #1 card (①) of the servo. This card is energized at its opposite terminals by a constant A. C. voltage E having instantaneous opposite polarity as indicated with respect to a suitable reference A. C. source. The card is also grounded at an intermediate point nearer the lower limit of airspeed for a purpose hereinafter described. The derived voltage at slider contact 15' represents $f(V_T)$ and is fed by conductor 16 to a line amplifier 17 having an output transformer 18 for producing an amplified signal voltage of opposite polarity. This signal voltage is fed by conductor 19 to card #2 of the blade angle ($B_p$) servo system 20 which is controlled by circuits, Fig. 3, hereinafter described. It will be noted that the airspeed function voltage is also indicated as fed to other engine simulating circuits which are duplicates of the presently shown blade angle and associated systems.

This blade angle card #2 is also energized at its lower portion as indicated by a constant A. C. voltage $E_4$ representing the constant $C_4$ for reverse thrust in the above equations. As shown, the card is grounded at its opposite terminals and is energized by the aforesaid voltages at intermediate points insulated from each other at 21a as indicated to represent positive and negative blade angle positions. Accordingly the voltage derived at slider 21 of $B_p$ card #2 represents the product of $f(V_T)$ and a function of blade angle; in the case of positive blade angle $f(V_T) \cdot \phi(B_p)$, and in the case of negative blade angle $C_4 \cdot \phi(B_p)$. This derived signal voltage is fed by conductor 22 to the propeller load (PL) summing amplifier 23 where it is added to a constant A. C. voltage input $E_2$ representing the constant $C_2$. The output transformer 24 of this amplifier produces at its terminals 25 and 30 oppositely phased voltages as indicated representing propeller load PL. These output voltages it will be noted correspond to the positive and negative blade angle relationships for propeller load above referred to in connection with Equations 1 and 2.

A negative PL voltage at terminal 25 is fed by conductor 26 to the $B_p$ card #3. This card is energized by said voltage at its upper terminal and at its lower terminal through a shunt connection 27 including a resistance 27'. The derived voltage at slider 28 therefore represents the product of PL and a function of blade angle, i. e., $PL f(B_p)$. This voltage at slider terminal 29 is fed to a corresponding terminal of the circuits of Fig. 2 hereinafter described.

The positive PL voltage at transformer terminal 30 is fed by conductor 31 to the lower terminal of card #4 of the air density ($\rho$) servo. This card is grounded at its upper terminal and the voltage at slider 32 represents the product of PL and a function of air density, i. e. $PL \cdot f(\rho)$. This function voltage is in turn fed by conductor 33 to the upper terminal of card #5 of the brake horsepower (B. H. P.) servo. This card is grounded at its lower terminal and the derived voltage at slider 34 now represents the combined product of $PL \cdot f(\rho)$ and a function of brake horsepower, i. e., $PL \cdot f(B. H. P.) \cdot f(\rho)$. This voltage at slider terminal 35 is fed to a corresponding terminal in the circuits of Fig. 2 hereinafter described.

The air density ($\rho$) servo above referred to is controlled according to simulated altitude and sea level air density. The altitude ($h$) servo generally indicated at 36 may be controlled in the manner shown in my aforesaid copending application S. N. 134,623 and includes a card 37 that is energized at its lower terminal by a constant A. C. voltage E and is grounded at its upper terminal so that the derived voltage at slider 38 decreases with increase in simulated altitude. This voltage which represents a function of altitude $f(h)$ is fed by conductor 39 to the servo amplifier 40 of the air density servo. An instructor's density control comprises a dial 41 that operates through a connection 42 the slider 43 of a datum potentiometer 44. This card is energized at its terminals by oppositely phased voltages and is grounded at its center position. The derived voltage which represents sea level or datum air density ($\Delta \rho$) is fed to the servo amplifier 40. This servo is of the balancing type and is provided with an "answer" card 41, the derived voltage (negative) at slider 41' of which is a feed back input for the amplifier 40 for positioning the servo according to the balance between the answer voltage and the sum (positive) of the other two voltages in a manner well known in the art. Accordingly, the positioning of the slider 32 of the aforesaid air density card #4 as previously described is according to the computed air density at the altitude of the simulated flight.

For present purposes it is sufficient to represent B. H. P. simply as a combined function of manifold air pressure (M. A. P.) and engine R. P. M. To this end the simulated throttle control 45 is connected as indicated at 46 to the slider 47 of a potentiometer 48 that is energized at its upper terminal by a constant voltage E and is grounded at its lower terminal. The derived voltage at slider 47 is assumed to represent a function of M. A. P. and this voltage is fed by conductor 48 to the potentiometer 49 of the R. P. M. servo system generally indicated at 50. This card is grounded at its lower terminal and the voltage derived at its slider contact 51 representing $f(M. A. P.) \cdot f(R. P. M.)$ is fed to the servo amplifier 52 of the brake horsepower (B. H. P.) servo system. This servo is of the balancing type and has an answer card 53 for deriving at slider 53' an answer voltage for the amplifier 52. Accordingly the slider 34 of the aforesaid B. H. P. card #5 is positioned as previously described according to the computed valve of B. H. P.

Referring now to Fig. 2, the simulated "master R. P. M." control 55 is connected as indicated at 56 to the slider 57 of a potentiometer 58. This card is energized at its upper terminal by a constant voltage E and is grounded at its lower terminal so that the voltage derived at slider 57 may represent the R. P. M. of the master motor (R. P. M.$_m$) according to adjustment of the master R. P. M. control. This voltage is fed by conductor 59 to the line amplifier 60, the output transformer 61 of which produces at terminal 62 an amplified voltage signal representing R. P. M.$_m$. This signal voltage is fed by conductor 63 to the line amplifier 64 which is used to produce a signal voltage at the terminal 65 of the output transformer 66 representing blade angle change ($\Delta B_p$). This signal voltage is a summation of voltages by the amplifier 64 representing respectively: at the amplifier terminal 29, $PL \cdot f(B_p)$; at terminal 35, $$PL \cdot f(B.H.P.) \cdot f(\rho);$$

at terminal 67 a constant A. C. voltage $E_1$ representing the constant $C_1$; and from the R. P. M.$_m$ line amplifier 60—61 a voltage representing R. P. M.$_m$ Accordingly the resultant output voltage of the line amplifier 64—66 represents:

$$B_p = -C_1 PL \cdot f(B_p) - PL \cdot f(B. H. P.) \cdot f(\rho) R. P. M._m$$

Equation 3

The blade angle change voltage ($B_p$) is fed by conductor 68 through the "engine seize" relay contact 69 and conductor 70 to the servo amplifier 50 of the engine R. P. M. servo presently described. Another input for the R. P. M. servo is the master R. P. M. signal that is fed from the line amplifier 60—61 by way of conductors 63 and 71, through "engine seize" relay switch 72 and conductor 73 to the input of the R. P. M. servo 50.

It will be noted that the aforesaid master R. P. M.$_m$ signal can be fed to duplicate apparatus representing other engines of a multiple engine aircraft.

The engine seize relay 74 may be energized as indicated for simulating "engine seize" through the instructor's "trouble" switch 75, as shown. The seize relay is shown deenergized and the relay switches 72 and 69 are in the "free" positions. Engine "seize" is simulated by the instructor throwing a switch 75 to the "seize" position. This connects a voltage E to the relay coil 74 to cause energization of the relay and movement of the contacts 72 and 69 to the "seized" positions. This grounds and removes the inputs for the R. P. M. servo amplifier so that the servo "answer" voltage runs the servo to zero to simulate a "seized" engine, i. e., zero R. P. M.

Another input for the R. P. M. amplifier 50 is a voltage representing the product of true airspeed $V_T$ and a constant $C_3$ that is controlled according to blade angle. For this purpose the true airspeed servo has a card 76 energized as indicated for deriving according to true airspeed a signal voltage at slider 76'. This voltage energizes the line amplifier 77, the output transformer 78 of which produces a voltage signal $+V_T$ at terminal 79 that is fed in turn by conductor 80 to the switch card #7 of the blade angle servo system 20 and also to duplicate apparatus as indicated representing other engines. The switch card #7 is connected at the lower conducting portion 7c to the conductor 80 and is grounded at the upper conducting portion 7b, the conducting portions being interrupted by an insulating portion 7a. When the slider 82 is at the upper part of the card the derived voltage is zero (grounded) and when it is below the insulation 7a, it is connected directly to the output of the true airspeed amplifier. The slider 82 is connected by conductor 83 to the R. P. M. amplifier 50 so that this signal input may be either zero or $C_3V_T$ according to whether positive or negative blade angle is simulated. The constant $C_3$ is introduced by the design of the amplifier input resistance. The R. P. M. servo has an answer card 84 for deriving at slider 84' an answer voltage for the servo amplifier. Also the servo may have a card 85 for deriving at slider 85', a voltage representing engine R. P. M. for energizing an indicator 86 calibrated to represent an engine tachometer.

To summarize, the input voltages for the R. P. M. servo amplifier represent respectively: $\Delta B_p$, R. P. M.$_m$, zero or $C_3V_T$, depending on blade angle, and R. P. M. (answer). The servomotor will run until the summation of the input voltages is zero or in the specific case illustrated, $$0 = \text{R. P. M.(ans.)} + (0 \text{ or } C_3V_T) - \text{R. P. M.}_m + \Delta B_p$$

Transposing and substituting for $\Delta B_p$, Equation (3), for positive blade angles:

$$\text{R. P. M.(ans.)} = C_1 - PL \cdot f(B_p) + PL \cdot f(\text{B. H. P.}) \cdot f(\rho)$$

And for negative blade angles:

$$\text{R. P. M.(ans.)} = C_1 - PL \cdot f(B_p) + PL \cdot f(\text{B. H. P.}) \cdot f(\rho) - C_3V_T$$

These R. P. M. equations for positive and negative blade angles it will be noted correspond to the relations originally stated, namely Equations 1 and 2 respectively.

*Propeller blade angle calculation and control*

Referring to Fig. 3, when the pilot calls for "automatic synchronization" of his engines, by setting the control quadrant, Fig. 4, at "automatic" the automatic relay will be in the "automatic" position and the feather, reverse pitch, increase R. P. M. and decrease R. P. M. relays will be deenergized. Under these conditions, the only input to the $B_p$ servo amplifier at 20 is voltage $\Delta B_p$ through the reverse pitch and automatic relays as indicated.

The $B_p$ servomotor will run until the resultant input is zero, or:

$$\Delta B_p = 0$$

Substituting from Equation 3, $$-C_1 + PL \cdot f(B_p) - PL \cdot f(\text{B. H. P.}) \cdot f(\rho) + \text{R. P. M.}_m = 0$$

By substitution of terms of Equation 1

$$\text{R. P. M} = \text{R. P. M.}_m$$

Therefore the blade angle servo will adjust itself until the engine R. P. M. servo position is equal to the master R. P. M. control setting. This simulates the characteristics of the propeller synchronization system in question.

In Fig. 3, the voltage signal from line amplifier 64—66 (Fig. 2) representing blade angle change ($\Delta B_p$) is used during "automatic" operation for controlling the blade angle integrating servo 20 for representing blade angle $B_p$. For normal control of blade angle, there are disclosed various relays and control circuits for controlling the $B_p$ servo for simulating "feather," reverse pitch, increase and decrease R. P. M. on manual control, and voltage "booster" operation.

In the case of automatic operation the automatic relay coil 90 is energized (Fig. 5) so as to throw the relay switches 91, 92 and 93 to the "automatic" position indicated; also the reverse pitch relay coil 94 is deenergized (Fig. 4) so that the relay switches 95, 96 and 97 are in the "forward" positions as illustrated. Accordingly, the blade-angle-change voltage $\Delta B_p$ from terminal 65 of the line amplifier 64—66 is fed by conductor 98, reverse switch 95, conductor 99 and automatic switch 93 to the input side of the blade angle servo amplifier 20a. This input constitutes the control voltage for the blade angle servo on "automatic" since the other input indicated "manual" is grounded through the automatic switch 92. This grounding circuit includes the amplifier input conductor 100, switch 101 of "feather" relay (the coil 102 of which is deenergized (Fig. 4), to represent "normal" positioning of the feather switches 101 and 103), conductor 104, "reverse" switch 96, conductor 105, slider 10a and conducting portion 10c of blade angle switch card #10 (positive blade angle position), conductor 106, and the grounded "automatic" switch 92.

The blade angle servo 20 includes a motor-generator set and is essentially the same as the airspeed servo of Fig. 1 except that the motor control winding 20b is adapted to be short circuited under certain conditions hereinafter described for deenergizing the servomotor. The servo includes four switch cards #10, #11, #12 and #13 of the same general type shown in connection with the blade angle control in Fig. 2. The slider constitutes the movable switch element and is positioned according to operation of the blade angle servo.

It will therefore, be seen that the blade angle servo on "automatic" operation functions as an integrating servo for integrating the blade angle change voltage $\Delta B_p$ and positioning the various potentiometers and switch cards under control of the servomotor within the limits of automatic operation according to blade angle adjustment.

For "manual" operation the selector quadrant (Fig. 4) is moved away from "automatic" and the automatic relay is deenergized (Fig. 5), so that the aforesaid "automatic" input connection for the blade angle servo is grounded by "automatic" switch 93. The servo can now be operated through the "increase" or "decrease" R. P. M. relays and also put in "feather" or "reverse" pitch to simulate such control under manual operation. It is to be understood that in the actual operation of a variable pitch, constant R. P. M. system of the type in question, the signal for increased R. P. M. causes for a given engine power setting, a commensurate decrease in blade angle.

Assuming now a call for increased R. P. M., the coil 107 of the "increase R. P. M." relay is energized (Fig. 4), so as to throw the relay switches 108 and 109 to the "increase" positions. An A. C. voltage $+E$ is thereby applied as indicated through a speed limiting voltage divider comprising resistances 118 and 119 to the input of the blade angle servo at the connection marked "manual," the complete circuit including the "increase R. P. M." switch 108, conductor 110, "decrease R. P. M." switch 111, coil 112 of which is deenergized (Fig. 4), to cause positioning of the relay switches 111 and 113 at the "off" position shown, conductor 114, "automatic" switch 92, conductor 106, conductor 10c of blade angle card #10 (positive pitch), slider 10a and conductor 105, reverse pitch switch 96 (forward), conductor 104, feather switch 101 (normal), and conductor 100 to the blade angle servo amplifier 20a. This signal voltage has a phase relationship tending to operate the blade angle servo at a normal rate toward a lower pitch position until the "increase R. P. M." relay is deenergized thereby removing the decrease pitch signal.

In calling for decreased R. P. M., the "decrease R. P. M." relay is energized (Fig. 4), so as to throw the relay switches 111 and 113 to the "decrease" position. The switch 111 accordingly connects the servo input conductor 100 to an oppositely phased A. C. voltage through the same circuit (from switch 111) as above described for "increase R. P. M." operation. The increase-blade-angle signal —E from the blade angle switch card #13 is applied by conductor 115 through a speed limiting voltage divider comprising resistances 116 and 117 to the "decrease R. P. M." switch 111. The voltage divider 116 and 117 is connected to the circuit for limiting this signal voltage as required for realistic simulation of normal rate of blade angle increase; also for grounding the servo input when the blade angle reaches its upper limit stop represented by the insulation 13b of the switch card #13. Accordingly the blade angle servo runs toward an increased pitch position until the "decrease R. P. M." relay is deenergized, or the switch card #13 functioning as a limit switch grounds the input conductor 100.

For simulating "feathering" (maximum pitch) of the propeller, the "feather" relay coil 102 is energized (Fig. 4), so as to throw the feather switches 101 and 103 to the "feather" position. This places the aforesaid A. C. signal voltage —E from the blade angle switch card #13 on the "manual" input conductor 100 of the servo through the feather switch 101 and conductor 115. This signal drives the blade angle servo at maximum speed to the maximum pitch or feather position without interruption until the slider 13a of card #13 engages the insulating portion 13b thereby deenergizing the servo as above described.

For simulating a reverse pitch operation, the reverse pitch relay coil 94 is energized (Fig. 4), to throw the reverse switches 95, 96, and 97 to the "reverse" positions. The switch 95 in this position grounds the "automatic" input of the blade angle servo through conductor 99 and "automatic" switch 93, assuming the automatic relay is energized. The servo is then operated at maximum speed into reverse pitch by a signal voltage +E from the blade angle switch card #12 through a circuit including slider 12a, conductor 120, voltage booster relay switch 121, the relay coil 122 of which is energized (Fig. 4), to hold the relay switches 121, 123 and 125, on "normal," conductor 126, "reverse" switch 96, conductor 104, "feather" switch 101 and the servo input conductor 100. Accordingly the signal +E operates the servo into reverse pitch until the slider 12a of switch card 12 (which functions as a reverse limit switch) contacts the insulating portion 12b thereby deenergizing the servo. This represents full blade angle reverse. The energization of the servo directly by the positive signal +E through the voltage booster switch 121, etc., causes the servo to run at high speed for simulating fast reversal of blade angle.

Under "normal" and "forward thrust" (positive blade angles) conditions (manual control), the blade angle switch card #11 is adapted to shunt or short circuit the servo motor coil 20b so as to cancel energizing flux and prevent "drifting" of the motor under conditions of "fixed pitch" when the "increase" and "decrease" relays are both "off." The shunt circuit comprises a conductor 130 connected to the lower terminal of the motor coil 20b, the conductor 11c of the switch card #11, slider contact 11a and conductor 131, feather switch 103, (normal) conductor 132, reverse switch 97 (forward), conductors 133 and 134, "increase R. P. M." switch 109 (off), conductor 135, "decrease R. P. M." switch 113 (off), conductor 136, automatic switch 91 (manual), and conductor 137 which is connected to the upper terminal of the servomotor coil 20b. It will be noted that for lower positive (below 15°) and reverse blade angle values, the switch card slider 11a engages the insulation 11b so as to interrupt the aforesaid shunt circuit and permit operation of the blade angle servo into reverse.

For simulating the operation of the voltage booster to cause high speed "forward" of the blade angle, from "reverse" the voltage booster relay switch 123 applies a signal —E to the servo input conductor 100 through a circuit including the booster switch 123, conductor 138, conductor 10b of switch card #10, slider contact 10a and conductor 105, reverse switch 96 (forward), conductor 104, feather switch 101 (normal), and the input conductor 100. This high speed "forward" continues until the slider 10a of the switch card engages insulation 10d whereby the booster voltage is cut off. Further increase in blade angle depends on the normal circuits above described. As previously explained the "voltage booster" switch 121 (normal) connects an oppositely phased signal +E from switch card #12 to the servo for simulating fast blade reversal.

For simulating failure of the voltage booster, the "voltage booster" relay coil is deenergized (Fig. 4), thereby positioning the booster switches 121, 123 and 125 at "fail." Normal operation on "automatic," "increase R. P. M." or "deceatse R. P. M." is the same as before since the booster relay switches do not control either the "automatic" signal $\Delta B_p$ or the "increase" or "decrease" signals through the "decrease R. P. M." switch 111. However, the "booster" switch 125 short circuits the servomotor coil 20b through the "auto" switch 91 and the "decrease" and "increase" switches 113 and 109 (off), so that the servo cannot be run to "feather" except through the normal "decrease R. P. M." circuit above described. Also the "booster" switch 123 places a ground on the servo input conductor 100 when the blade angle is in reverse pitch (through switch card #10) regardless of whether "reverse" or "forward" is called for. If the call is for "reverse," the ground circuit is through "booster" switch 121 and "reverse" switch 96, and if for "forward" through switch 96. Thus the servo cannot get out of "reverse" if the "voltage booster" fails.

*Propeller control selector quadrant*

Referring to Fig. 4, the pilot's propeller control selector quadrant is generally indicated at 140. The selector lever 141 may be operated by the pilot, or flight engineer, between the positions indicated, namely "automatic," "increase R. P. M.," "fixed pitch," "decrease R. P. M.," and "feather." The selector lever switch 142, is adapted selectively to engage the circuit terminals 143, 144 and 145 corresponding to the "automatic," "increase R. P. M." and "decrease R. P. M." positions respectively. The selector lever is adapted to be held at the "automatic" position by a suitable spring detent device or the like generally indicated at 146 when the pilot moves the lever to "automatic." The lever is also manually controlled for establishing the "increase R. P. M.," "decease R. P. M.," and "feather" positions, and is suitably spring-biased as indicated at 147 so that it returns to the intermediate "fixed pitch" position when released by the pilot at any position other than the "automatic" position. The "feather" switch 148, normally spring-biased to the open position is closed by means of the lever 141 when it is moved to the "feather" position of the quadrant.

When the selector lever is positioned at "automatic" on the quadrant, it remains in this position as previously explained until manually moved to another position by the pilot. In "automatic" a D. C. voltage $E_{dc}$ is applied to the "automatic" system through the circuit including the D. C. power relay (the coil 150 of which is normally energized through the instructor's "D. C. power" switch 151 from the source $E_{dc}$), conductor 152, the instructor's "propeller trouble" switch 153 shown positioned at "normal," conductor 154, "propeller normal circuit breaker" 155, conductor 146 and control selector switch 142 to the "automatic" terminal 156, for connection to a corresponding terminal, Fig. 5, for energizing the "automatic" relay above described.

At the "increase R. P. M." position of the selector lever, the voltage from the aforesaid D. C. power relay on switch 142 energizes the coil 107 of the "increase R. P. M." relay through the circuit including the selector switch 142 and terminal 144, conductor 157, relay coil 107, conductor 158 and the slider 15a and grounded conductor portion 15c of the B_p switch card #15, assuming positive values of blade angle as indicated. The relay circuit is interrupted for low (below 15° for example) and reverse pitch angles by the insulating portion 15b of the switch card.

The "increase R. P. M." relay can also be energized directly from D. C. power relay through the instructor's trouble switch 153 when it is positioned on the "overspeed" terminal 159. This terminal is connected by conductor 160 directly to the relay conductor 157 and coil 107 so that the "trouble circuit overrides the normal circuit and causes "overspeeding" of the propeller.

At the intermediate or "fixed pitch" position, the selector lever controls no circuits so that there is no change in pitch control, Fig. 3, and the propeller continues to operate at the pitch previously selected.

At the "decrease R. P. M." position the aforesaid D. C. voltage from the power relay on selector switch 142 energizes the coil 112 of the "decrease R. P. M." relay through the circuit including the selector switch 142 and terminal 145, conductor 161, relay coil 112 and conductor 162 to complete the circuit to ground through switch 163 of the "reverse pitch" relay shown in deenergized or "forward" position.

When the selector lever is moved to "feather" position, it closes the "feather" switch 148 which in turn completes an energizing circuit for the coil 102 of the "feather relay." This circuit includes D. C. voltage from the power relay switch 149, conductor 164, voltage booster circuit breaker 165, conductor 166, relay coil 102, and conductor 167 to complete the circuit to ground through the "feather" switch 148. The feather switch automatically opens to deenergize the feather relay due to its spring bias when the selector lever is moved to another position. The coil 122 of the "voltage booster" relay is normally energized through the "voltage booster circuit breaker" 165 when the D. C. power relay is energized (normal). The voltage booster circuit breaker (CB), as in the case of other circuit breakers herein shown, may be under the control of the instructor as desired, either by manual or suitable remote control means for simulating opening or "blowing" of a circuit breaker due to overload, etc.

The throttle operated "reverse" switch 170 is operatively connected as indicated to the throttle 45 and is adapted when thrown to the "reverse" position to energize the coil 94 of the "reverse pitch" relay for throwing relay switches 163 and 171 to "reverse" positions. The coil energizing circuit includes the aforesaid D. C. voltage source at the power relay, trouble switch 153 (normal), conductors 154 and 172, reverse switch 170, conductor 173 and relay coil 94 to ground. If during the reversing operation the voltage booster CB 165 "blows" thereby deenergizing the voltage booster relay coil 122, a holding circuit is completed for the "reverse" coil 94 through the power relay switch 149, conductor 164, slider 14a and conductor portion 14b of the B_p switch card #14, conductor 174, switch 175 of the voltage booster relay, conductor 176, reverse switch 171, (reverse) and relay coil 94 to complete the circuit to ground.

Coincident with deenergization of the voltage booster relay, the booster switch 121, Fig. 3, moves to the "fail" position thereby removing the "decrease pitch" signal +E derived from B_p switch card #12 and preventing completion of the reversal operation.

It will be noted that as long as the "voltage booster" is "blown," the reverse pitch relay is locked in "reverse" position, thereby preventing operation of this relay to the "forward" position and so preventing normal operation.

The reverse pitch relay can also be locked in "reverse" through the instructor's trouble switch 153 when it is positioned at the "freeze" terminal 177. The locking circuit includes conductors 178 and 176, reverse switch 171 and coil 94, thus simulating "freeze" of the propeller blades in reverse pitch position as presently described.

In actual propeller construction, an electrically controlled brake is used to hold the blade angle fixed when no change is called for. During blade angle change the brake is deenergized through a special control circuit, the arrangement being such that failure of the electric control for the brake causes setting or "freezing" of the brake so as to hold the propeller in fixed pitch. In such a case the pilot is able through a special feather control circuit to increase the blade angle or operate the blade feather; also this feather control can be used to feather the propeller in case of propeller overspeed. The blade angle cannot be decreased during "freeze."

For simulating the aforesaid propeller brake "freeze" the instructor's switch 153 is thrown as above described to the "freeze" terminal 177. If at that time the blade angle is positive and above the minimum pitch stop (15°), the trouble switch 153 deenergizes and prevents pick-up of the "increase" and "decrease R. P. M." relays and also the "automatic" relay by removing voltage from the trouble switch "normal" terminal 168, thereby preventing through the normal circuits further change in blade angle.

Also for the same reason, the reverse pitch relay 94 cannot be energized through the "normal" circuit so that operation of the throttle reverse switch for this purpose to "reverse" position is ineffective.

If however, at the time of "freeze" the propeller is in or moving toward reverse pitch, the reverse pitch relay is held energized through its switch 171 so as to establish a holding circuit for the reverse pitch relay coil 94 as previously described. Thus, the propeller is held in reverse pitch through the holding circuit so established and can be operated from this "freeze" position only through the separate feather control circuit previously described which by passes the instructor's trouble switch 153.

Irrespective of the position of the trouble switch, the reverse pitch relay may also be locked in reverse to simulate failure of the voltage booster when the blade angle is at the low stop (15°) or below by means of the blade angle switch card #14. The holding circuit from the D. C. power relay includes conductor 164, switch card #14, conductor 174, booster switch 175 (fail), and reverse switch 171.

*Master motor, propeller underspeed and synchronizing controls*

Referring to Fig. 5, the "master R. P. M." control lever 55 is adapted to control energization of the coil 180 of the master motor relay through a switch 181, that is operated by a cam 182 according to the position of the master R. P. M. control. This switch is normally closed except when the master R. P. M. control is at the "full decrease" position, at which point the switch is open and the master motor relay deenergized. The coil 180 of this relay receives power from the D. C. source E_dc through the D. C. power relay switch 183, conductor 184 and master motor circuit breaker 185.

Normally, the master motor relay is at the "on" position so as to impress through the relay switch 186 and conductor 187 a D. C. voltage +E_dc on the master R. P. M. potentiometer 188. This potentiometer is grounded at its lower terminal and its slider contact 189, together with the cam 182, is connected as indicated at 190 to the master R. P. M. control lever 55. The slider 189 is connected by conductor 191 to a R-C time delay circuit of well known type for simulating the delay in the master motor adjustment following a change in the master R. P. M. control setting. The conductor 191 is connected to the control grid 192 of an electronic valve 193 through a time delay circuit comprising a condenser 194 and a parallel connected resistance 195 having a negative D. C. voltage $-E_{dc}$ impressed thereon. Normally the valve is biased to cut-off and no current flows in the plate circuit 196. However, if the master R. P. M. control is moved at a rate sufficient to cause the derived D. C. voltage on condenser 194 to raise the grid potential above the cut-off point, the valve becomes conducting and current in the plate circuit causes energization of the "master motor off-speed" relay 197 and pick-up of the relay switch 198 to the "off-speed" position. The time delay in the pick-up of this relay depends on the characteristics of the aforesaid R-C circuit and the rate of change of the master R. P. M. control setting. After the master R. P. M. control has reached its new setting, the negative bias on the valve grid is restored and the valve is again biased to cut-off causing deenergization of the off-speed relay 197.

During the above described "off-speed" condition, the "synchronizer-off" signal light 199 is energized by a D. C. voltage $E_{dc}$ through a circuit including the signal lamp and conductor 200, off speed relay switch 198, conductor 201, master motor relay switch 202 to ground completing the circuit. Coincident with lighting of the "synchronizer-off" lamp, the master motor tachometer 203 is controlled also by a time delay R-C circuit to simulate the indicated delay in master motor adjustment. A suitable D. C. indicator calibrated to represent a tachometer is connected to the conductor 191 through the time delay circuit comprising a resistance 204 connected in parallel with a condenser 205 to ground as illustrated. This R-C circuit has substantially the same time delay characteristics as the aforesaid R-C circuit 194—195.

When the "master motor off-speed" relay is deenergized to represent an "on-speed" condition, the coil 90 of the "automatic" relay may be energized through "off-speed" switch 198 by the voltage appearing at terminal 156, which corresponds to the terminal of the control selector quadrant at "automatic" position, Fig. 4. Coincident with lighting of the "synchronizer-off" lamp, the master motor tachometer 203 is controled also by a time delay R-C circuit to simulate the indicated delay in master motor adjustment. A suitable D. C. indicator calibrated to represent a tachometer is connected to the conductor 191 through the time delay circuit comprising a resistance 204 connected in parallel with a condenser 205 to ground as illustrated. This R-C circuit has substantially the same time delay characteristics as the aforesaid R-C circuit 194—195.

Normally when the blade angle is above the minimum-stop position (15°), the energizing circuit for the automatic relay includes terminal 156, switch 206 (operated by cam 207 and controlled as indicated by the $B_p$ servo), conductor 208, automatic relay coil 90, "off-speed" switch 198, conductor 201 and master motor relay switch 202. When the blade angle reaches minimum pitch as indicated the cam 107 opens the switch 206 to deenergize the automatic relay; thus, blade angle is prevented from decreasing below the minimum pitch value on "automatic" control.

For the purpose of pick-up "automatic" control at the low pitch stop, as when increased blade angle is called for, a thyratron controlled switch 209 is connected in shunt with the $B_p$ switch 206 so as to energize the automatic relay when a positive increment of blade angle ($\Delta B_p$) is called for. When the thyratron is "fired" this switch is opened; otherwise the switch is closed. To this end, a propeller underspeed (PU) amplifier 210 as energized by the voltage appearing on terminal 65, corresponding to the output terminal of the $\Delta B_p$ line amplifier 64—66, Fig. 2. This voltage is the same as that applied to the blade angle servo amplifier, Fig. 3. The output of PU amplifier representing propeller underspeed is applied to the control grid of a thyratron indicated at 111 which is normally biased to cut-off at all negative values of the control potential on terminal 65. When the thyratron is energized by a positive potential representing underspeed, i. e. a call for decreased blade angle, the thyratron fires and energizes the underspeed relay coil 212 for operating relay switch 209 and deenergizing the automatic relay. Accordingly, when the blade angle is below minimum and a decrease in blade angle is called for, the automatic relay cannot be energized. However, if an increase in blade angle is called for, the thyratron relay 212 is deenergized (switch 209 on "normal") and the automatic relay may be energized through the control quadrant "automatic" position, Fig. 4, so as to bring the blade angle back into the normal operating range.

Summary of operation

For normal operation the instructor's "propeller trouble" switch 153, Fig. 4, is at "normal," the "propeller normal" circuit breaker 155 is closed, the instructor's D. C. power switch 151 is at "normal" and the "voltage booster" circuit breaker 165 is closed. Accordingly, D. C. "power" voltage is on the propeller selector quadrant through the D. C. power relay, propeller trouble switch and propeller normal circuit breaker.

*Automatic.*—When the selector quadrant is in the "automatic" position D. C. voltage from the selector quadrant is fed through the $B_p$ servo cam switch 206, Fig. 5, and the "propeller underspeed" thyratron switch (in parallel) to the "automatic" relay. This relay is grounded through the "master motor off-speed" relay switch 198 and the "master motor" relay switch 202 except when the "master motor" is off-speed or inoperative. When the "automatic" relay is energized, Fig. 3, it connects through its switch 93 the $\Delta B_p$ input to the $B_p$ integrating servo enabling the servo to compute blade angle according to the relations previously described.

If the computing circuits call for a blade angle less than the minimum 15° the cam on the $B_p$ servo, Fig. 5, will break the circuit of the "automatic" relay, since under these conditions the "propeller underspeed" thyratron will be "fired," and the parallel connected switch 209 also open thus simulating the low pitch stop.

If now the computing circuits call for a blade angle greater than 15° the "propeller underspeed" thyratron, Fig. 5, will "cut off" due to the negative voltage, thereby dropping out and closing the switch 209 and completing a circuit to energize the "automatic" relay. Accordingly, the $\Delta B_p$ input is again connected to the $B_p$ servo, Fig. 3, permitting the servo to compute blade angle in the manner above described. It will be noted that for a computed increase pitch signal $\Delta B_p$, the "automatic" relay can be energized even though the blade angle be at or less than 15°. The conditions under which the computed blade angle will exceed the high pitch stop are so unlikely that no provision is made for such simulation.

*Decrease R. P. M.*—In the "decrease R. P. M." position of the selector quadrant (call for increased pitch), voltage from the D. C. power relay is fed to the "decrease R. P. M" relay, the circuit of which is completed through the "reverse pitch" relay contacts, Fig. 4. The "decrease R. P. M." relay, Fig. 3, when energized switches a negative signal voltage to the $B_p$ servo through switch 92 of the "automatic" relay, which is now at "manual," switch card #10 of the $B_p$ servo and contacts of the "reverse pitch" and "feather" relays. This negative signal causes the $B_p$ servo to run toward increased pitch until reaching "feather," at which point this signal circuit is opened by the $B_p$ limit switch card #13 to prevent damage to the servo mechanism. The "decrease R. P. M." relay can, of course, be deenergized by the selector quadrant at any desired point whereupon the $B_p$ servo is deenergized and the control held in "fixed pitch." Where the blade angle is greater than 15° and the control is on "fixed pitch" the $B_p$ servomotor control coil is shortened, Fig. 3, through contact of the "automatic," "decrease R. P. M.," "increase R. P. M.," "reverse pitch," and "feather" relays and the $B_p$ switch card #11. This prevents the $B_p$ servo from "drifting" due to magnetic pick-up since an integrating servo has no answer voltage for restoring it to a definite position. Normally, the "decrease R. P. M." relay can be energized except when the control is on "reverse pitch."

*Increase R. P. M.*—In the "increase R. P. M." position of the selector quadrant (call for decreased pitch), voltage from the D. C. power relay is fed to the "increase R. P. M." relay. The circuit of this relay is connected to ground through the $B_p$ switch card #15, Fig. 4. When energized, the "increase R. P. M." relay, Fig. 3, switches a positive signal voltage to the $B_p$ servo through contacts of the "decrease R. P. M." and "automatic" relays, $B_p$ switch card #10 and contacts of the "reverse pitch" and "feather" relays. This positive signal causes the $B_p$ servo to run toward minimum pitch (unless a "fixed pitch" position has been determined by the selector quadrant) until the low pitch stop (15°) is reached, at which time the $B_p$ servo switch card #15, Fig. 4, opens the ground circuit of the "increase R. P. M." relay. Under these conditions the $B_p$ servomotor control coil can no longer be shorted to represent "fixed pitch," Fig. 3, through the $B_p$ switch card #11 and further control beyond this point is through "reverse pitch" as presently described. Normally the "increase R. P. M." relay can be energized, except when the blade angle is 15° or less.

*Feather.*—In the "feather" position of the selector quadrant, the feather switch is closed to make a ground connection for the feather relay, the relay circuit being connected to the D. C. voltage source through the "propeller voltage booster" circuit breaker and the D. C. power relay, Fig. 4. When energized, the "feather" relay, Fig. 3, switches a negative signal voltage from card #13 directly to the $B_p$ servo causing the blade angle to increase. When the servo reaches "feather," the $B_p$ switch card #13 removes the negative signal to prevent further energization of the motor.

*Reverse.*—When the throttle is pulled back past the closed position, the throttle operated forward-reverse switch, Fig. 4, is moved to the "reverse" position. This places D. C. voltage on the "reverse pitch" relay which is then energized. The reverse pitch relay now switches (switch 96) a positive signal voltage from card #12 to the $B_p$ servo, Fig. 3, through contacts of the "feather" relay and "propeller voltage booster" relay causing the blade angle to decrease. When fully reversed, the $B_p$ switch card #12 removes the signal voltage to deenergize the motor.

Under the above described conditions, if the selector quadrant is in "automatic" Fig. 4, and if the "PU thyratron," Fig. 5, should cut off, the "automatic" relay will become energized; however the $\Delta B_p$ input has been grounded by the "reverse" relay (switch 95), Fig. 3, so that "automatic" operation is not possible when the throttle is in "reverse pitch" position.

If the selector quadrant were held in the "increase R. P. M." position the "increase R. P. M." relay would not be energized since its ground circuit is broken by the $B_p$ switch card #15, Fig. 4. It will be noted that if the selector quadrant is moved to the "automatic" position when the blade is to be moved out of reverse, the automatic relay will be energized (through the propeller under speed thyratron relay, Fig. 5) as the throttle is moved to "forward." Under these conditions the blade angle servo 20 is energized by both the aforesaid negative voltage —E and a negative pitch change signal voltage $\Delta B_p$, the former voltage of course being predominant for moving the blade rapidly out of reverse. At the minimum pitch, 15°, the larger negative voltage is cut out by the blade angle switch card #10 and the normal blade angle change voltage $\Delta B_p$ takes over for "automatic" control. If the selector quadrant were held in the "decrease R. P. M." position the "decrease R. P. M." relay would not be energized since its ground circuit is broken by the "reverse pitch" relay contacts.

If the selector quadrant is moved to the "feather" position it closes the feather switch and ground is connected to the "feather" relay which is energized through the "voltage booster" circuit breaker and the D. C. power relay.

When energized, the "feather" relay (switch 101), Fig. 3, removes the reversing signal ($B_p$ card #12) from the $B_p$ servo and substitutes a negative signal voltage ($B_p$ card #13) causing the blade angle to increase. When the servo has run to the "feathered" position the $B_p$ switch card #13 removes the negative signal so as to deenergize the motor. If the selector quadrant is moved from the "feather" position while the throttle is still in "reverse," Fig. 4, the blade angle will reverse as before.

*Reverse—forward.*—Pushing the throttle back to "forward" pitch will deenergize the "reverse pitch" relay by breaking its power circuit, thereby connecting through switch 96, Fig. 3, a negative signal voltage from the voltage booster switch 123 and $B_p$ card #10 to the $B_p$ servo causing the blade angle to increase and move out of reverse until the low pitch stop is reached, at which time the $B_p$ switch card #10 removes the negative signal and, assuming that the selector quadrant is now in the "fixed pitch" position, a circuit is completed through the $B_p$ switch card #11 and the "feather," "reverse pitch," "increase R. P. M.," "decrease R. P. M." and "automatic relays" to short circuit the $B_p$ servomotor control coil as above described. When the selector quadrant is in the "fixed pitch" position and the throttle is not in "reverse," all the blade angle changing relays are deenergized and the $B_p$ servomotor is shorted to hold the blade angle constant. At the low pitch stop the "automatic" control can take over as desired.

*Propeller normal CB.*—It will now be assumed that the "propeller normal" circuit breaker (CB) is "blown," i. e. opened due to some simulated electrical fault, overload, etc. The instructor's trouble switch, Fig. 4, is at "normal" and the "propeller normal" CB 155 is open. The "voltage booster" CB is closed. Under these conditions when the selector quadrant is in the "automatic," "decrease R. P. M." or "increase R. P. M." positions there is no voltage on the selector quadrant and the blade angle changing relays will remain deenergized and the $B_p$ servo shorted. The "reverse" and "feather" operations will not be affected and can be performed as described above in connection with normal operation. When the "propeller normal" CB blows, the propeller will operate at "fixed pitch" in the absence of further control or correction of the trouble.

*Blade angle freeze.*—It will now be assumed that the blade angle control has "frozen" due to simulated loss of power for the brake control, selector quadrant, etc. previously referred to. The instructor's trouble switch is at "freeze," Fig. 4, and the "propeller normal" CB is closed. The "voltage booster" CB is also closed. Under these conditions the selector quadrant and the "reverse pitch" switch 170 are without voltage. When the selector quadrant is at any position other than "feather," or when the throttle is moved into "reverse," the blade angle changing relays will remain deenergized and the $B_p$ servomotor will remain shorted to hold the servo in fixed pitch. However, the "feather switch" still has voltage so that moving the selector quadrant to "feather" will cause operation of the $B_p$ servo as above described to the "feather" position.

If the propeller is in reverse pitch when the instructor "freezes" the propeller, the "reverse" relay will remain energized by voltage through the "freeze" position of the instructor's trouble switch and the holding contacts of the "reverse pitch" relay thereby preventing return to forward pitch except by "feathering" since the feather control is still operable as above described.

*Propeller overspeed.*—It will now be assumed that a "propeller overspeed" condition exists such as due to malfunctioning of the blade angle control system. The instructor's trouble switch now is at "overspeed" and the "propeller normal" and "voltage booster" circuit breakers are both closed, Fig. 4. Under these conditions the selector quadrant and the "reverse pitch" switch have no voltage supply. The "increase R. P. M." relay has voltage from the instructor's "trouble" switch and so, if unopposed, will cause the blade angle servo to run to the low pitch stop at which point the $B_p$ switch card #15 opens the relay ground circuit. However the selector quadrant cannot energize either the "decrease R. P. M." or "automatic" relays, nor can the throttle reverse switch energize the "reverse pitch" relay. If now the selector quadrant is put in the "feather" position, ground will be switched to the "feather" relay. This relay has a circuit to power through the "voltage booster" CB 165 and when energized, it switches out the positive signal voltage from switch 108 of the "increase R. P. M." relay, Fig. 3, and substitutes therefor a negative signal voltage to the $B_p$ servo from $B_p$ card #13 causing the servo to run toward increased blade angle. When the "feather" position is reached the $B_p$ switch card #13 removes the negative signal from the "feather" switch 101 and the $B_p$ servo to prevent over-running of the motor.

*Voltage booster CB.*—It will now be assumed that the "voltage booster" CB 165 is "blown." This results in deenergizing the voltage booster relay 122. The instructor's trouble switch, Fig. 3, is at "normal," the "propeller normal" CB 155 is closed and the "voltage booster" CB 165 is open. Under these conditions the selector quadrant has voltage through the trouble switch and the normal CB 155. Accordingly, the blade angle system can be operated through the slector quadrant in the "automatic," "decrease R. P. M." or "increase R. P. M." positions as above described. With the selector quadrant at "feather," the feather switch is closed but the ground circuit of the feather relay is broken by the booster CB 165 and so the feather relay will not be energized. "Feathering" can be obtained through the normal "decrease R. P. M." control. The "reverse" relay however can be energized by the throttle "reverse" switch 170.

If the selector quadrant is in "fixed pitch" and the blade angle is greater than 15°, pulling the throttle into reverse will energize the "reverse" relay but the "voltage booster" relay switch 121, Fig. 3, now cuts off the positive voltage from card #12 to the reverse pitch relay switch 96 so that the blade angle servo will not reverse and remains in fixed pitch. Movement of the throttle to "forward" will restore "automatic" and "manual" operations. If the selector quadrant is in the "automatic" position but the blade angle does not reach the low pitch stop during throttling back to get into reverse pitch, the operation is as described in the previous paragraph.

If the selector quadrant is in "fixed pitch" position and the blade angle is 15°, or if the selector is in "automatic" position and the blade angle reaches 15° while throttling back to get into reverse pitch, the following sequence takes place:

When the "reverse" switch closes, the "reverse pitch" relay is energized but the blade angle will not change since the $B_p$ servomotor is shorted through contacts of the "voltage booster" relay, switch 125, and the "increase R. P. M.," "decrease R. P. M." and "automatic" relays, Fig. 3. Forward movement of the throttle will not deenergize the "reverse pitch" relay, Fig. 4 since it is now energized through a holding circuit including its switch 171, the "voltage booster" relay switch 175 and the $B_p$ switch card #14. If the selector quadrant is moved to "increase R. P. M. the D. C. voltage cannot energize the "increase R. P. M." relay due to the interrupted ground circuit at the $B_p$ switch card #15. Moving the selector quadrant to "decrease R. P. M." will connect voltage to the "decrease R. P. M. relay but it would not be energized as its ground circuit is broken by the "reverse pitch" relay switch 163. Moving the selector quadrant to "automatic" may energize the "automatic" relay but since the $\Delta B_p$ input has been removed by the "reverse pitch" relay, Fig. 3, the blade angle servo will remain at fixed pitch. If the "voltage booster" CB blows while the propeller is in reverse or is being reversed, the conditions above outlined will obtain. If the "voltage booster" CB blows while the blade angle is going out of reverse, the blade angle would stop changing. However if the selector quadrant were moved to the "decrease R. P. M." position it would supply D. C. voltage to the "decrease R. P. M." relay which now has its ground circuit completed through the "reverse relay" contacts. Energizing the "decrease R. P. M." relay will remove the short circuit from the $B_p$ servomotor but the negative signal voltage for running the servo out of "reverse" has been switched out by the "voltage booster" relay, switch 123, Fig. 3; also the negative signal voltage normally switched in by the "decrease" R. P. M." relay is cut out by the $B_p$ switch card #10. The "increase R. P. M." relay cannot be energized because its ground connection has been opened by the $B_p$ switch card #15.

The operation of the present simulating system as above described in connection with normal operation and blowing of the "normal" and "voltage boost" circuit breakers is intended to duplicate the conditions prevailing on the electric propellers of the C-124 aircraft under similar situations. The operation described in "freezing" of the blade angle control is intended to simulate loss of power to the selector quadrant from some cause other than a blown normal circuit breaker such that the aircraft crew cannot correct the trouble. Loss of reverse pitch control is also simulated which could be brought about by an open circuit to the throttle reverse switch. The conditions described in connection with "propeller overspeed" would in practice be caused by the same troubles as in frozen blade angle control in addition to slipping brake on the pitch change motor.

*Master motor CB.*—It will now be assumed that the "master motor" CB 185, Fig. 5, is blown. Opening of this breaker will deenergize the "master motor" relay causing the relay switch 202 to break the ground connection for the "automatic" relay. Under these conditions the propeller control will be normal except for the "automatic" position which will now have the same control effect as the "fixed pitch" position. The "synchronizer-off" lamp 199 will remain lighted and the "master motor tachometer" 203 will read zero regardless of operations of the "master R. P. M." control 55.

*D. C. bus.*—It will now be assumed that there is failure of the "D. C. bus supply." This trouble is introduced to the synchronizing system by the instructor's "D. C. power" switch 151, Fig. 4, for deenergizing the "D. C. power" relay. The relay switch 149 is now at the "fail" position so that power is removed from the "master motor" relay, selector quadrant, "feather" relay, "reverse pitch" switch and the "voltage booster" relay. This causes the propeller to remain in "fixed pitch" with no means of changing blade angle whatever since the blade angle servo cannot now be energized. If the propeller is reversed at the time of power failure the "reverse pitch" relay will drop out but the blade angle cannot change because the $B_p$ servomotor is shorted through contacts of the "voltage booster" relay and the "increase R. P. M.," "decrease R. P. M.," and "automatic" relay.

It should be understood that this invention is not limited to specific details of construction and arrangement thereof herein illustrated, and that changes and modifications may occur to one skilled in the art without departing from the spirit of the invention.

What is claimed is:

1. In grounded aircraft training apparatus of the type having means for computing simulated flight and engine conditions responsive to operation of simulated aircraft controls by a student for representing simulated flight conditions and aircraft operations, means for simulating propeller and engine operation comprising control means for simulating master R. P. M. as a standard of the engine speed, an electrical system jointly responsive to control quantities derived by said computing means according to functions of simulated propeller load and brake horsepower and a control quantity representing master R. P. M. setting for computing the called-for change in blade angle, and a servo system responsive jointly to said electrical system and to a control quantity derived according to simulated master R. P. M. for computing and indicating engine R. P. M.

2. Simulating apparatus as specified in claim 1 including means for deriving a control quantity according to simulated air speed, and means controlled according to simulated blade angle for applying said voltage to the R. P. M. servo system only when reverse pitch is indicated for computing engine R. P. M. under reverse pitch conditions.

3. Simulating apparatus as specified in claim 1 including voltage deriving means responsive to the setting of the simulated master R. P. M. control, time delay means responsive to the rate of adjustment of the master R. P. M. control, and indicating means representing a master motor tachometer responsive thereto for simulating characteristic delay in speed adjustment of the master motor.

4. In grounded aircraft training apparatus of the type having means for computing simulated flight and engine conditions responsive to operation of simulated aircraft controls by a student, means for simulating propeller and engine operation comprising control means for simulating master R. P. M. as a standard of the engine speed, a simulated propeller control selector quadrant and simulated throttle control, means including said throttle control for producing a control quantity representing called-for blade angle change, a servo mechanism controlled by said selector quadrant and responsive alternatively to the control quantity representing called-for blade angle change for simulating automatic operation, and selectively, to a plurality of control quantities from said selector quadrant to represent various conditions of manual operation including increase and decrease R. P. M., said servo mechanism being positioned to represent propeller blade angle.

5. Apparatus as specified in claim 4 including means responsive to said throttle control for energizing means representing "reverse pitch," operation of said reverse pitch means in turn causing transfer of control from "automatic" operation and operation of said servo mechanism in direction and extent so as to represent reverse pitch of the propeller.

6. Simulating apparatus as specified in claim 4 including a summing amplifier that is energized by voltages representing respectively a constant and simulated air speed and blade angle for producing potential representing propeller load, means for modifying said potential according to simulated blade angle, air density and brake horsepower, and a second summing amplifier responsive jointly to said modified potential and to a voltage representing master R. P. M. for producing a voltage representing called-for blade angle change.

7. Aircraft training apparatus for simulating propeller and engine operation comprising a simulated propeller control selector quadrant and simulated throttle and master R. P. M. controls, a first servo system responsive alternatively to a voltage derived according to the blade angle change called for representing automatic operation and a voltage representing manual operation for computing blade angle, said selector quadrant controlling application of said voltages to said first servo, an electrical system jointly responsive to said first servo system and to said master R. P. M. control for representing called-for blade angle change, means for modifying the effect of said first servo system on said electrical system according to simulated air density, brake horsepower and airspeed, said electrical system having a feedback connection to said first servo system for the aforesaid alternative automatic control voltage, and a second servo system jointly responsive to said electrical system and to said master R. P. M. control for computing and indicating engine R. P. M.

8. Training apparatus for simulating aircraft propeller operation comprising means adjustable according to simulated blade angle, electronic means controlled according to the sense of the blade angle change called for, both said means being interconnected whereby simulated blade angle below a predetermined minimum results in deenergization of the blade angle means when the sense of the blade angle change is negative and energization of said means when the sense is positive in simulated underspeed condition of the propeller.

9. Simulating apparatus for representing the operation of an aircraft propeller comprising a servo system adjustable to represent blade angle, a relay for controlling said servo system operable according to simulated automatic or manual propeller operation, means for producing a voltage representing blade angle change for controlling said servo to simulate automatic operation, and a plurality of relays representing manual operation operable according to calls for increased or decreased R. P. M., feathering and reverse respectively for introducing voltages of corresponding sense to said servo system, said feather relay adapted to override the other manual operation relays, and means for disabling said servo system to simulate loss of bus power.

10. Simulating apparatus for representing the operation of an aircraft propeller comprising an electric servo system adjustable to represent blade angle, selector means for controlling said servo system operable according to simulated "automatic" or "manual" propeller operation, computing means responsive to flight and engine simulating means for producing potential representing called-for blade angle change for controlling said blade angle servo to simulate automatic operation, and a plurality of means representing manual operation operable respectively according to calls for increase R. P. M., decrease R. P. M., feathering or reverse for introducing potential of corresponding sense to said servo system, said feathering means adapted to override the other manual operation means for insuring feathering under adverse simulated conditions.

11. Simulating apparatus for representing the operation of an aircraft propeller comprising an electric servo system adjustable to represent blade angle, a relay for controlling said servo system operable according to simulated automatic or manual propeller operation means for deriving control quantities representing functions of simulated airspeed, brake horsepower and master R. P. M., computing means operatively connected with the control quantity deriving means and said blade angle servo system for deriving a voltage representing called-for blade angle change, said computing means being operatively connected with the blade angle servo means for controlling said blade angle servo to simulate automatic operation, and a plurality of relays representing manual operation operable respectively according to calls for increase R. P. M., decrease R. P. M., feathering or reverse for introducing voltages of corresponding sense to said servo system, said feathering relay adapted to override the other manual operation relays for insuring feathering under adverse simulated conditions.

12. In grounded aircraft apparatus of the type having flight and engine computing means responsive to operation of simulated aircraft controls by a student for simulating flight conditions and aircraft operation, means for simulating propeller and engine operation comprising means representing a master synchronizing motor adjustable to derive potential according to predetermined master motor R. P. M., means responsive jointly to said computing means and to said master R. P. M. means for deriving potential representing the called-for change in propeller blade angle, and a servo mechanism of the self-positioning type jointly responsive to the master R. P. M. potential and the blade angle change potential for indicating engine R. P. M.

13. In grounded aircraft apparatus of the type having flight and engine computing means responsive to operation of simulated aircraft controls by a student for simulating flight conditions and aircraft operation, means for simulating propeller and engine operation comprising means for simulating a master synchronizing motor adjustable to derive potential according to predetermined master motor R. P. M., means responsive jointly to said computing means and to said master R. P. M. means for deriving potential representing the called-for change in propeller blade angle, a servo mechanism of the self-positioning type jointly responsive to the master R. P. M. potential and the blade angle change potential for indicating engine R. P. M. and means for representing respectively propeller blade angle and air speed adjustable according to simulated air speed and blade angle for jointly deriving additional potential when reverse blade angle is represented, said servo mechanism also being responsive to said additional potential.

14. In grounded aircraft apparatus of the type having flight and engine computing means responsive to operation of simulated aircraft controls by a student for simulating flight conditions and aircraft operation, means for simulating propeller and engine operation including means for computing the called-for change in blade angle, comprising means adjustable to derive a voltage representing master R. P. M., means for deriving a voltage representing a function of airspeed and simulated blade angle to represent a function of propeller load, servo means energized by potential representing functions of simulated engine R. P. M. and throttle position for representing engine brake horsepower, said servo means in turn modifying said propeller load voltage according to simulated brake horsepower, and means jointly responsive to said master R. P. M. voltage, said propeller load voltage and said last-named modified voltage for producing a voltage representing called-for blade angle change.

15. In grounded aircraft apparatus of the type having flight and engine computing means responsive to operation of simulated aircraft controls by a student for simulating flight conditions and aircraft operation, means for simulating propeller and engine operation including means for computing the called-for change in blade angle, comprising means adjustable to derive a voltage representing master R. P. M., means for deriving a voltage representing airspeed, means for modifying the airspeed voltage according to simulated blade angle to represent a function of propeller load, servo means responsive to throttle adjustment as modified by simulated engine R. P. M. for representing engine brake horsepower, said servo means in turn modifying said propeller load voltage according to simulated brake horsepower, and a summing amplifier jointly energized by said master R. P. M. voltage, said propeller load voltage and said last-named modified voltage for producing a voltage representing the called-for blade angle change.

16. Simulating apparatus for representing the operation of an aircraft propeller comprising an electric servo system adjustable to represent blade angle, means selectively operable for controlling said servo system to represent "automatic" or "manual" blade angle control, said servo system including a motor having a control coil and circuit controlling means positioned by said motor, said circuit controlling means adapted in conjunction with said selectively operable means to short circuit said motor coil for holding said motor in fixed position to represent "fixed pitch" in positive blade angle under manual control, said circuit controlling means also adapted to remove said short circuit under reverse blade angle conditions to permit operation of said motor in the reverse angle range.

17. Simulating apparatus for representing the operation of an aircraft propeller comprising an electric servo system adjustable to represent blade angle, means selectively operable for controlling said servo system to represent "automatic" or "manual" blade angle control, a pair of relays representing "increase R. P. M." and "decrease R. P. M." respectively for introducing voltages of opposite sense to said servo for manual operation, said servo system including a motor having a control coil and circuit controlling means positioned by said motor, said circuit controlling means adapted in conjunction with said selectively operable means and said relays to short circuit said motor coil for holding said motor in fixed position to represent "fixed pitch" in positive blade angle under manual control, either of said relays adapted to remove said short circuit and said circuit controlling means also adapted to remove said short circuit under reverse blade angle conditions to permit operation of said motor in the reverse angle range.

18. Training apparatus for simulating aircraft propeller operation comprising electric servo means adjustable according to the blade angle simulated, electronic means controlled according to the sense of the called-for blade angle change, parallel-connected circuit controlling means operable respectively by said servo system and said electronic means for controlling energization of a relay that is selectively operable between positions representing "automatic" and "manual" operation, said relay controlling energization of said servo system, said circuit controlling means permitting energization of said relay to the "automatic" position when the servo system represents positive blade angle and causing deenergization of said relay to represent "manual" operation when the servo system represents negative pitch, said electronic means causing energization of said relay independently of said servo system when the sense of the called-for blade angle change is positive for representing operation of the blade out of reverse pitch.

19. Training apparatus for simulating aircraft propeller operation comprising servo means adjustable according to the blade angle simulated, computing means responsive to the operation of simulated controls by a student for determining the sense and magnitude of a control quantity representing called-for blade angle change, electronic means controlled by said quantity according to the sense of the called-for blade angle change, circuit controlling means operable respectively by said servo system and said electronic means for controlling energization of a relay representing "automatic" and "manual" operation, said relay controlling energization of said servo system, said circuit controlling means adapted at positive blade angle to cause energization of said relay to the "automatic" position for energizing said servo system by said control quantity and to deenergize said relay to represent "manual" operation at negative pitch means for energizing said servo system by another control quantity during "manual" operation, said electronic means causing energization of said relay independently of said servo system when the sense of the called-for blade angle change is positive for representing operation of the blade out of reverse pitch.

20. Training apparatus for simulating aircraft propeller operation comprising servo means adjustable according to the blade angle simulated, computing means responsive to the operation of simulated controls by a student for determining for "automatic" operation the sense and magnitude of a control quantity representing called-for blade angle change, electronic means controlled by said quantity according to the sense of the called-for blade angle change, circuit controlling means adjustable by said servo means according to blade angle, said circuit means adapted at positive blade angle to complete a circuit for energizing said servo by other control quantities to represent "manual" operation of blade angle for increasing and decreasing pitch, said circuit means also adapted at minimum blade angle to break said circuit and to establish another circuit for operating said servo in reverse pitch, means responsive to said electronic means for energizing said servo by said control quantity in response to "forward pitch" demand, said servo while in the reverse pitch range thereby being energized concurrently by the "automatic" and "manual" control quantities whereby "automatic" operation takes over when the blade angle has moved out of and away from reverse pitch.

21. Training apparatus for simulating aircraft propeller operation comprising electric servo means adjustable according to the blade angle simulated, a propeller control selector quadrant operable by a student between positions including "increase R. P. M." and "feather," means for simulating propeller over-speed comprising a relay representing "increase R. P. M." for energizing said servo from a source of voltage in sense to operate the servo toward low-pitch, a switch under control of an instructor for energizing said relay to simulate over-speed, and a second relay representing "feather" adapted to be energized by operation of said quadrant by the student for switching out the "increase R. P. M." voltage and switching in a voltage of opposite sense to run the servo to "feather."

22. In grounded aircraft training apparatus of the type having flight and engine computing means responsive to operation of simulated aircraft controls including throttle control, by a student for simulating flight conditions and aircraft operation, means for simulating propeller and engine operation including means for producing a voltage corresponding in sense and magnitude to the called-for change in blade angle, comprising an electric integrating servo system responsive to said voltage for representing blade angle, the energizing circuits for said servo including two relays representing "reverse" and "automatic" operation respectively, the "reverse" relay being controlled in accordance with operation of said throttle and the "automatic" relay having parallel energizing circuits, one of which includes means operable in accordance with minimum blade angle and the other includes means operable according to the sense of the aforesaid blade angle change voltage, said "automatic" relay also being controlled by relays representing respectively a synchronizing master motor and master motor "off-speed" arranged to deenergize the "automatic" relay to represent either failure of the master motor or "off-speed."

23. Simulating apparatus for representing "manual" operation of an aircraft propeller comprising a propeller control selector quadrant movable by a student to positions representing "increase R. P. M." "decrease R. P. M.," "feather" and "fixed pitch" respectively, a pair of relays representing "increase R. P. M." and "decrease R. P. M." respectively adapted to be energized through said selector quadrant, and an electric integrating servo system adjustable to represent blade angle, said relays adapted to connect said servo to respective voltage sources for energizing the servo in sense corresponding to the called-for blade angle change, the energizing circuit of each of said relays including series-connected relays operable between positions to represent respectively "reverse-forward" pitch, and "feather-normal," the feather-normal relay when energized to represent "feather" establishing a circuit that by-passes all said other relays for connecting a voltage directly to said servo in sense to cause "feathering."

24. In an aircraft training apparatus of the type having computing means responsive to the operation of simulated controls by a student for simulating flight conditions and aircraft operation, means for simulating the synchronizing of engine-propeller R. P. M. with a master motor R. P. M. comprising means representing a master motor control adjustable to derive potential representing master motor R. P. M., an electric integrating servo system representing blade angle, means jointly responsive to said computing means, said master R. P. M. potential and said servo system for producing potential representing called-for blade angle change, means representing a tachometer responsive to master R. P. M. potential and said blade angle change potential for indicating propeller-engine R. P. M., means representing a master motor tachometer responsive to said master potential, and means representing "manual" propeller control for energizing said servo system in sense to adjust blade angle for bringing the indication of the engine tachometer into agreement with the indication of the master tachometer.

25. In aircraft training apparatus of the type having computing means responsive to the operation of simulated controls by a student for simulating flight conditions and aircraft operation, means for simulating the synchronizing of engine-propeller R. P. M. with a master motor R. P. M. comprising means representing a master motor control adjustable to derive potential representing master motor R. P. M., an electric integrating servo system representing blade angle, means jointly responsive to said computing means, said master R. P. M. potential and said servo system for producing potential representing called-for blade angle change, said servo system being responsive to said called-for change voltage in simulation of automatic blade angle control, means representing a tachometer jointly responsive to master R. P. M. potential and said blade angle change potential for indicating propeller-engine R. P. M., means representing a master motor tachometer responsive to said master potential, and a time-delay circuit operatively related to said master tachometer and responsive to rate of change in potential derived by said master control for simulating adjustment of the master motor to the master R. P. M. setting, and means representing "manual" propeller control for energizing said servo system in sense to adjust blade angle for bringing the indication of the engine tachometer into agreement with the indication of the master tachometer.

26. Training apparatus for simulating the synchronization of an aircraft engine-propeller combination with a master motor comprising means adjustable to represent blade angle and a first relay controlling said means representing "automatic" and "manual" operation, a second relay representing master motor operation, a master R. P. M. control and means operated thereby for deriving potential representing master R. P. M., a third relay representing master motor "off-speed" for controlling the energizing circuit of said first relay, time-delay means operatively related to said "off-speed" relay responsive to rate of change in the derived voltage for simulating adjustment of the master motor R. P. M. to the master R. P. M. setting, and signal means representing "synchronizer off," the energizing circuit of which is arranged to be completed alternatively through the second relay in the "off" position or through the off-speed relay in the "off-speed" position.

27. Training apparatus for simulating the synchronization of an aircraft engine-propeller combination with a master motor comprising a servo system adjustable to represent blade angle and a first relay controlling said servo representing "automatic" and "manual" operation, a second relay representing master motor operation, a master R. P. M. control and means operated thereby for deriving potential representing master R. P. M., a third relay representing master motor "off-speed" for controlling the energizing circuit of said first relay, a time-delay circuit operatively related to said off-speed relay and responsive to rate of change in the derived master voltage, and a signal lamp representing "synchronizer off," the energizing circuit of which is arranged to be completed alternatively through the second relay in the "off" position or through the off-speed relay in the "off-speed" position.

28. Simulating apparatus for representing "manual" control of aircraft propeller blade angle comprising a throttle control and a propeller control selector quadrant movable by a student to positions representing "increase R. P. M." "decrease R. P. M.," "feather" and "fixed pitch" respectively, an electric integrating servo system including a motor adapted to be energized in simulated manual blade angle control by voltages in sense corresponding to the called-for blade angle change, a first relay representing reverse pitch normally subject to throttle control by the student for introducing a reversing voltage to said servo, a second relay representing "voltage booster" operation subject to control by an instructor, said booster relay in the "fail" position thereof adapted in conjunction with said servo system to lock-in the reverse relay in simulation of failure of the voltage booster in reverse pitch, a third relay representing "feather" normally under control of the selector quadrant for connecting a voltage to said servo in sense to cause "feathering," said booster relay also adapted to deenergize said servo, and means controlled by said booster relay for locking said servo in "fixed pitch" position to represent booster failure.

29. Simulating apparatus for representing "manual" control of aircraft propeller blade angle comprising a propeller control selector quadrant movable by a student to positions represeting "increase R. P. M.," "decrease R. P. M.," "feather" and "fixed pitch" respectively, an electric integrating servo system including a motor adapted to be energized in simulated manual blade angle control by voltages in sense corresponding to the called-for blade angle change, means for electrically locking said servo in "fixed pitch" position when it is not energized, a first relay representing reverse pitch normally subject to throttle control by the student for introducing a reversing voltage to said servo, a switch under control of an instructor movable to a position representing blade angle "freeze," said switch in the "reverse" position of the reverse relay adapted to lock-in said relay at "reverse" position for precluding "forward" positioning thereof and normal energization of said servo, said switch also cutting out the selector quadrant control of "increase R. P. M." and "decrease R. P. M." voltages to said servo, and a relay representing "feather" normally under control of the selector quadrant for electrically unlocking said servo and for connecting a voltage to said servo in sense to cause "feathering" to simulate possible operation to "feather" after blade angle "freeze."

30. Simulating apparatus for representing the operation of a variable pitch aircraft propeller in association with engine responsive propeller pitch controls comprising an electric servo system positioned to represent blade angle, selector means for controlling said servo system selectively according to simulated "automatic" or "manual" propeller pitch control operation, simulating means for representing functions of air speed, propeller blade angle, engine brake horsepower and R. P. M., summing type computing means responsive to said simulating means for producing potential representing called-for blade angle change for controlling said blade angle servo system to simulate automatic pitch control operation, said automatic operation being a simulation of the changes in blade angle in response to engine control operation and a plurality of propeller condition establishing means each representing a distinct condition of manual pitch control operation operable respectively through the selector means according to called-for changes in blade angle, said changes variable in sense and degree, for introducing potentials of corresponding senses to said servo system to simulate manual pitch control operation.

31. Apparatus as specified in claim 30, wherein said means representing manual pitch control operation are operable respectively according to calls for simulated increased R. P. M., decreased R. P. M., feathering or reverse pitch.

32. A grounded aircraft training apparatus of the type having flight computing means responsive to operation of simulated engine and propeller controls by a student for representing simulated flight conditions for engine and propeller operation, including means for simulating propeller and engine operation comprising simulated throttle and master R. P. M. controls, an electrical system, means for deriving control quantities according to simulated propeller load, brake horsepower and master R. P. M. settings, said electrical system being responsive to said quantities for computing the called-for change in blade angle, a second electrical system responsive jointly to said first system and to a control quantity derived according to simulated master motor R. P. M. for computing and indicating engine R. P. M., a simulated propeller control selector quadrant, and a servo system controlled by said selector quadrant and responsive alternatively to a control quantity representing called-for blade angle change for simulating automatic operation, and selectively to control quantities from said selector quadrant to represent manual operation in simulation of increase in engine R. P. M., decrease in engine R. P. M. or feathering, said servo system being positioned to represent propeller blade angle and said throttle being adapted to operate means for applying to said blade angle servo system control potential for simulating reverse pitch operation.

References Cited in the file of this patent
UNITED STATES PATENTS

| 2,471,966 | Lukacs et al. | May 31, 1949 |
| 2,506,949 | Burelback et al. | May 9, 1950 |